United States Patent [19]

Shimizu

[11] Patent Number: 5,808,616
[45] Date of Patent: Sep. 15, 1998

[54] SHAPE MODELING METHOD AND APPARATUS UTILIZING ORDERED PARTS LISTS FOR DESIGNATING A PART TO BE EDITED IN A VIEW

[75] Inventor: Kazuma Shimizu, Tokyo, Japan

[73] Assignee: Canon Kabushiki Kaisha, Tokyo, Japan

[21] Appl. No.: 745,103

[22] Filed: Nov. 7, 1996

Related U.S. Application Data

[63] Continuation of Ser. No. 287,679, Aug. 9, 1994, abandoned.

[30] Foreign Application Priority Data

Aug. 25, 1993 [JP] Japan .................................. 5-210580

[51] Int. Cl.$^6$ .................................................. G06T 17/40
[52] U.S. Cl. .......................... 345/419; 345/418; 345/435; 364/468.04; 364/474.22; 364/474.24; 364/578
[58] Field of Search .............................. 345/418–20, 435, 345/441; 364/468.03, 464.04, 464.09, 464.1, 464.12, 474.22, 474.23, 474.24, 578

[56] References Cited

U.S. PATENT DOCUMENTS

| | | | |
|---|---|---|---|
| 4,058,849 | 11/1977 | Fitzgerald et al. | 395/102 |
| 4,845,643 | 7/1989 | Clapp | 364/518 |
| 4,855,939 | 8/1989 | Fitzgerald, Jr. et al. | 395/120 |
| 5,003,498 | 3/1991 | Ota et al. | 395/120 |
| 5,010,502 | 4/1991 | Diedel et al. | 395/120 |
| 5,119,309 | 6/1992 | Cavendish et al. | 364/474.24 |
| 5,237,647 | 8/1993 | Roberts et al. | 395/119 |
| 5,278,983 | 1/1994 | Kawabe et al. | 395/120 |

FOREIGN PATENT DOCUMENTS 0248919 12/1987 European Pat. Off. .

OTHER PUBLICATIONS

Foley, James D., et al, *Computer Graphics: Principles and Practices,* Addison–Wesley Publishing Co., 2nd ed. pp. 208–226 and 533–562, (1990).

Menon, Jai P., Constructive Shall Representations for Free-form Surfaces and Solids, *IEEE Computer Graphics and Applications Magazine,* pp. 24–36, (Mar. 1994).

Lamb, Del et al, "Interpreting a 3D Object From a Rough 2D Line Drawing," *Visuaalizations, 1990 conference,* pp 59–66, (1990).

Tech Illustrator, "User's Reference," Auto–trol Technology, pp. 3–1 to 3–20, 6–17 to 6–22, 10–9 to 10–12 and 13–7 to 13–10, (1992).

Proceedings of the Conference in Visualization, San Francisco, Oct. 23, 1990, 23 Oct. 1990 Institute of Electrical and Electronics Engineers, "Interpreting A 3D Oject From A Rough 2D Line Drawing", Lamb D et al, pp. 59–66.

*Primary Examiner*—Rudolph J. Buchel, Jr.
*Attorney, Agent, or Firm*—Robin, Blecker & Daley

[57] ABSTRACT

In a computer operated three-dimensional shape modeler where a group of parts are to be edified, a view of the parts layout is selected by the designer and list of the parts is created in the computer memory for that view. A part in the list is designated as a target part. A designer sketches a two-dimensional figure, which relates to a design change, on surfaces of the group of parts in the layout view. A cross section of the designated target part is automatically set as a "sketch surface". The cross sectional shape of the selected surface of the target part is modified by the two-dimensional sketch figure. A second part is designated as the target part and that part is switched over the other parts in the list. A cross section of the second target part is also automatically set as a sketch surface. The cross sectional shape of the surface of the second target part is modified in a similar fashion as the modification to the first part. All remaining parts affected by the designer's sketch of the two-dimensional figure are designated, switched forward, sketch surfaces automatically set and their shapes modified. When all parts affected by the designer's sketch of the two-dimensional figure are modified, then the designer selects an appropriate three-dimensional shape generator. A three-dimensional shape model corresponding to the view of the group of modified parts is then generated and displayed.

20 Claims, 14 Drawing Sheets

FIG. 5A
PARTS TABLE

| PART | ORDER OF ATTENTION | ATTENTION FLAG | SHAPE DATA | ADDED DATA | METHOD OF GENERATION |
|------|--------------------|-----------------|------------|------------|----------------------|
| 1 | 3 | 0 | | | |
| 2 | 1 | 0 | | | |
| 3 | 2 | 1 | | | |
| 4 | 5 | 0 | | | |
| 5 | 4 | 0 | | | |
| ⋮ | ⋮ | ⋮ | | | |

FIG. 5B
SHAPE DATA TABLE

| PART | VECTOR DATA | FRONT | PLAN | SIDE | ----- |
|------|-------------|-------|------|------|-------|
| 1 | | | | | |
| 2 | | | | | |
| 3 | | | | | |
| ⋮ | | | | | |

FIG. 5C

VIEW TABLE

| VIEW NUMBER | ICON | CATEGORY | ANGLE | DISTANCE | EQUATION |
|---|---|---|---|---|---|
| 1 | | FRONT | | | |
| 2 | | PLAN | | | |
| 3 | | BOTTOM | | | |
| 4 | | RIGHT SIDE | | | |
| 5 | | LEFT SIDE | | | |
| 6 | | BACK | | | |
| 7 | | ⋮ | | | |
| 8 | | | | | |
| 9 | | | | | |
| ⋮ | | | | | |

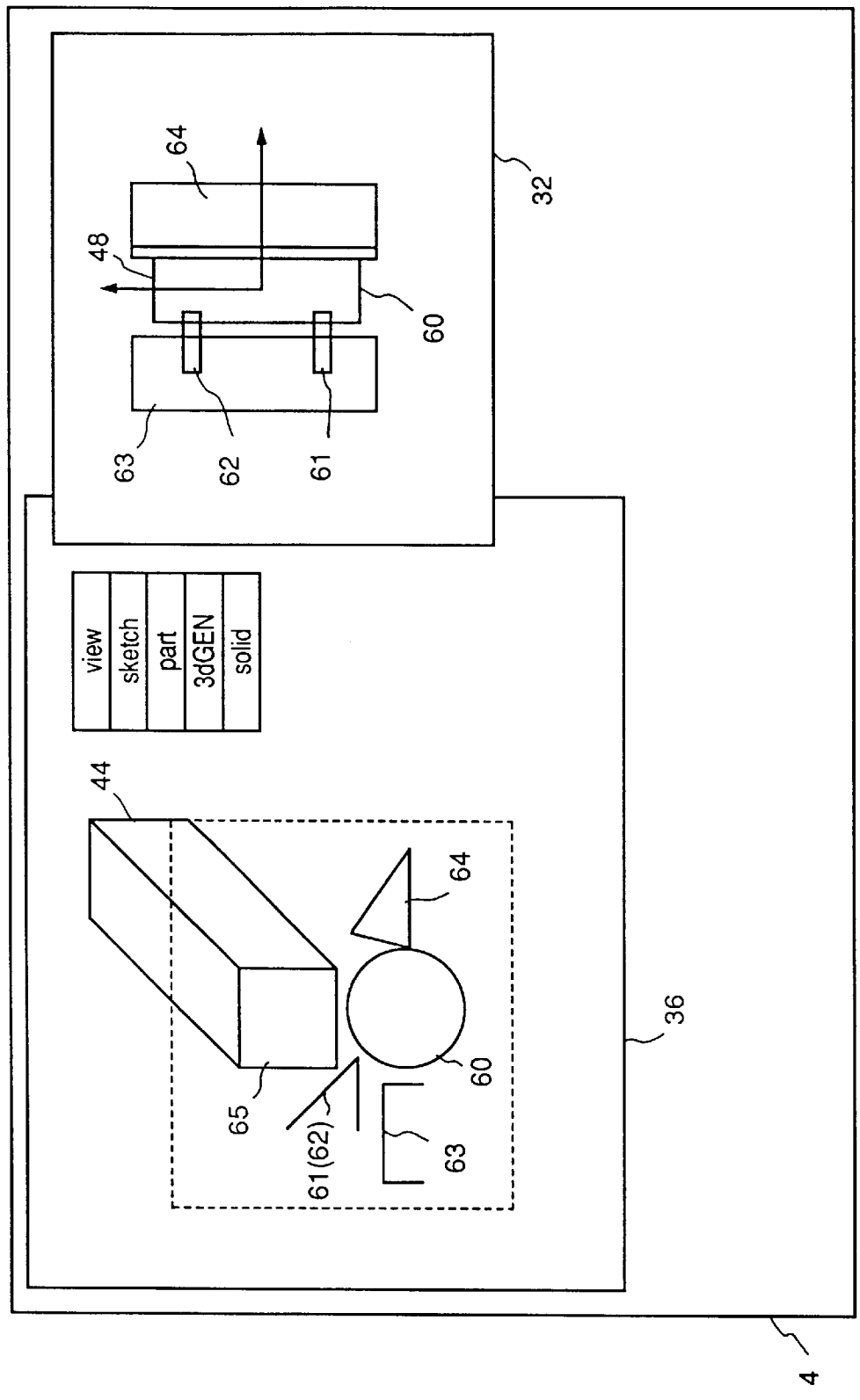

SHAPE MODELING METHOD AND APPARATUS UTILIZING ORDERED PARTS LISTS FOR DESIGNATING A PART TO BE EDITED IN A VIEW

This application is a continuation of application Ser. No. 08/287,679 filed Aug. 9, 1994, now abandoned.

BACKGROUND OF THE INVENTION

This invention relates to a CAD (computer aided design) apparatus utilized in the design of machines and the like and in drafting. More particularly, the invention relates to a shape modeling apparatus and method utilized in a computer system.

When modeling of machine parts and the like is performed in the prior art, the method adopted is to model part shape by performing the following operation for each part: First, the part to be created or corrected is specified, then a method of generating the shape of the part is designated and so is the sketch surface on which the cross section of the part is to be sketched. After the cross section is sketched, the three-dimensional shape of the part is generated.

In a case where layout design is performed in machine design in order to lay out the parts and units, shape and arrangement often are decided so as not to interfere with the arrangement and shape of surrounding parts and units.

However, according to the conventional shape modeling method in which parts are modeled on a per-part basis, a transition cannot be made to shape creation or correction processing of a succeeding part until the shape creation or correction of the preceding part is completed. Consequently, deciding shape and layout while applying the trial-and-error method to a plurality of parts simultaneously is not suited to a desirable layout design.

This will be described in specific terms with reference to FIGS. 1A through 1E. In FIG. 1A, a case is considered in which layout design is applied to a part 101 having the shape of a rectangular parallelepiped and a part 100 having an L-shaped configuration. FIG. 1B is a diagram showing the two parts 100, 101 of FIG. 1A when viewed from the front side. Now consider a case in which a triangular prism 103 having a triangular bottom as shown in FIG. 1C is added on to the rectangular parallelepiped 101. The designer (operator) has a picture of the figure of FIG. 1C in his or her mind and proceeds first to sketch a triangle 103, as shown in FIG. 1D, on a display screen appearing as illustrated in FIG. 1A or 1B. Next, by applying a "pushing" operation to the triangle 103 in the "depth" direction, the triangular prism 103 can be completed on the rectangular parallelepiped 101. By virtue of the "pushing" operation, the triangular prism 103 is formed on the rectangular parallelepiped 101, as shown in FIG. 1C. Next, while taking interference between the triangular prism 103 and L-shaped member 100 into consideration, the operator sketches a cut-out 104 in the front view of the member 100, as shown by way of example in FIG. 1E. If the "pushing" operation is applied to the cut-out 104, then a cut-out having the shape of a triangular prism will be formed on the inner side of the member 100.

With the prior-art technique relating to the sequence shown in FIGS. 1A through 1E, the layout design of the member 100, namely layout design which takes into account the interference between the part 100 and the part 101, cannot be carried out until after the layout design of the part 103 added on to the part 101 is finished. As will be understood from FIGS. 1B and 1D as well, in layout design or part-arrangement design taking interference into consideration, it is much more efficient to sketch the cut-out 104 in the part 100 at the stage where the sketching of the cross section of the part 103 to be added on to the part 101 has been completed.

Furthermore, according to the conventional method described above, the original shapes (101 and 103 in the example of FIG. 1A) and the sketched figure to be added on are not correlated. Consequently, when a portion of a part is subjected to a design change, the operator must resort to trial and error in order to correlate this portion and the whole of the part.

SUMMARY OF THE INVENTION

An object of the present invention is to provide a shape modeling apparatus and method so adapted that the arrangement or shapes of a plurality of parts can be designed with ease.

Another object of the present invention is to provide a shape modeling apparatus and method through which a two-dimensional figure is created on a sketching surface designated in relation to one part and a three-dimensional shape is generated from the two-dimensional figure.

A further object of the present invention is to provide an apparatus and method through which the sketching surface is one surface of the part.

A further object of the present invention is to provide an apparatus and method through which the method of generating the three-dimensional shape is designated separately.

Yet another object of the present invention is to provide an apparatus and method through which it is possible to designate the direction of view.

Another object of the present invention is to provide an apparatus and method through which a part of interest can be altered.

Another object of the present invention is to provide an apparatus and method in which the direction of a view is stored and the stored direction is capable of being applied whenever a part of interest is altered.

Another object of the present invention is to provide an apparatus and method in which a plurality of views can be designated and a new surface of a part based upon one view is utilized to generate a three-dimensional shape.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 5A through 5C are diagrams for describing the compositions of various tables used in this embodiment;

FIGS. 8A through 8D and FIG. 9 are diagrams for describing the procedure of an operation according to a modification.

DESCRIPTION OF THE PREFERRED EMBODIMENTS

A preferred embodiment to which the present invention is applied will now be described with reference to the accompanying drawings.

<System Configuration>

Figure 2A:
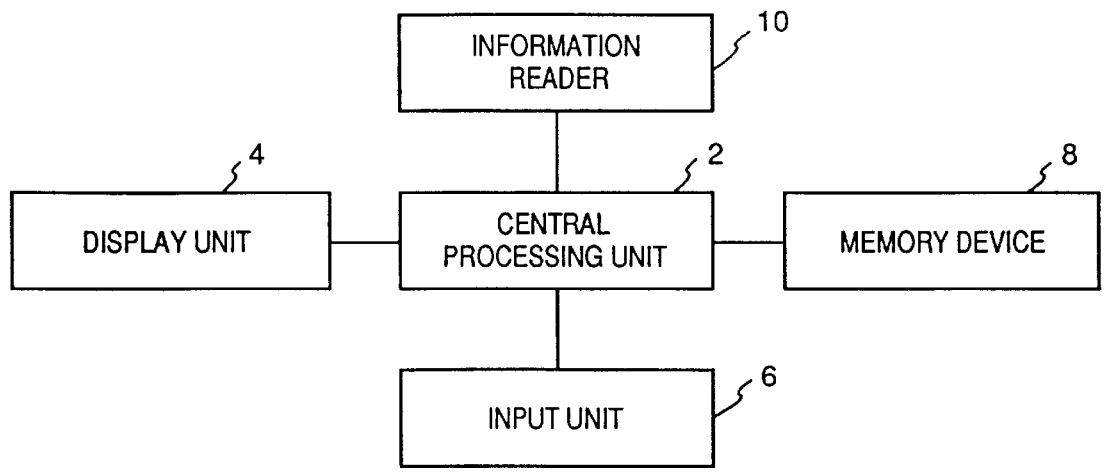
FIG. 2A is a block diagram showing the construction of a CAD apparatus according to an embodiment of the invention.

FIG. 2A is a block diagram illustrating the construction of a CAD apparatus to which a shape modeling method embodying the present invention is applied. The CAD apparatus includes a central processing unit 2, a display unit 4, an input unit 6, a memory device 8 and an information reading unit 10. These will now be described in detail.

The central processing unit 2 executes not only processing for shape modeling but also a plurality of processing operations described below. The display unit 4 displays sketched cross sections, three dimensional shapes that have been generated, a menu for designating processing methods, etc. The input unit 6 has a keyboard and a mouse as ordinary input means, as well as a so-called "soft" command box provided on the display unit 4 and having menus to which a plurality of control buttons are allocated. The input unit 6 is used to designate figure elements in a cross sectional sketch, enter information necessary for shape definition, select menus and enter other instructions. The memory device 8 stores programs for performing shape modeling, described later, as well as data representing the shapes of sketched cross sections and generated three-dimensional shapes, etc. The information reading unit 10 reads in a shape-modeling program from an external unit and stores the program in the memory device 8.

Figure 2B:
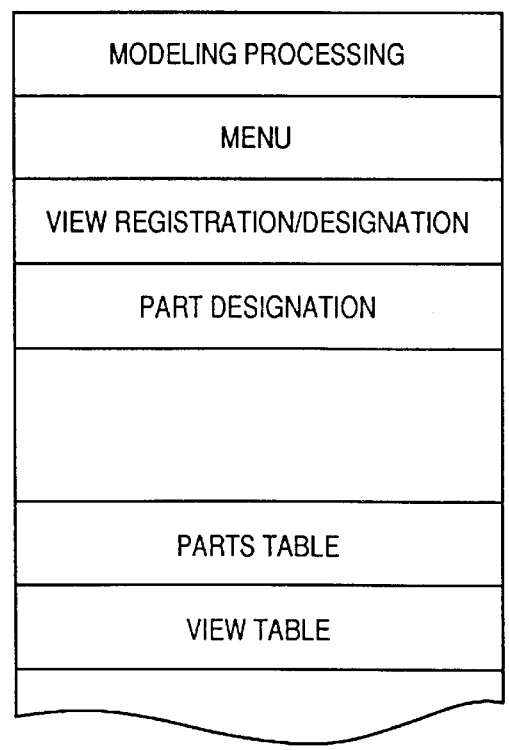
FIG. 2B is a diagram for describing the constitution of a software resource such as a table used in this embodiment.

FIG. 2B illustrates the functions with which a CAD program according to the invention is equipped. These functions are registered in the CAD program as a subroutine.

In this embodiment, the CAD program is read in a semiconductor RAM or in the memory device 8, such as a magnetic disk, from an external storage medium such as a magnetic tape or floppy disk through the information reading unit 10. This program is used to display three-dimensional shapes and cross-sectional shapes on the display unit 4. Data representing a three-dimensional shape or cross-sectional shape to be displayed is stored in the memory device 8. Further, a sketch of a cross-sectional shape needed for shape modeling and information such as a method of shape generation are designated via the input unit 6, a three-dimensional shape created by the central processing unit 2 based upon these designations is again displayed on the display unit 4 and the data representing the three-dimensional shape in the memory device 8 is updated.

<Principles>

Figure 3:
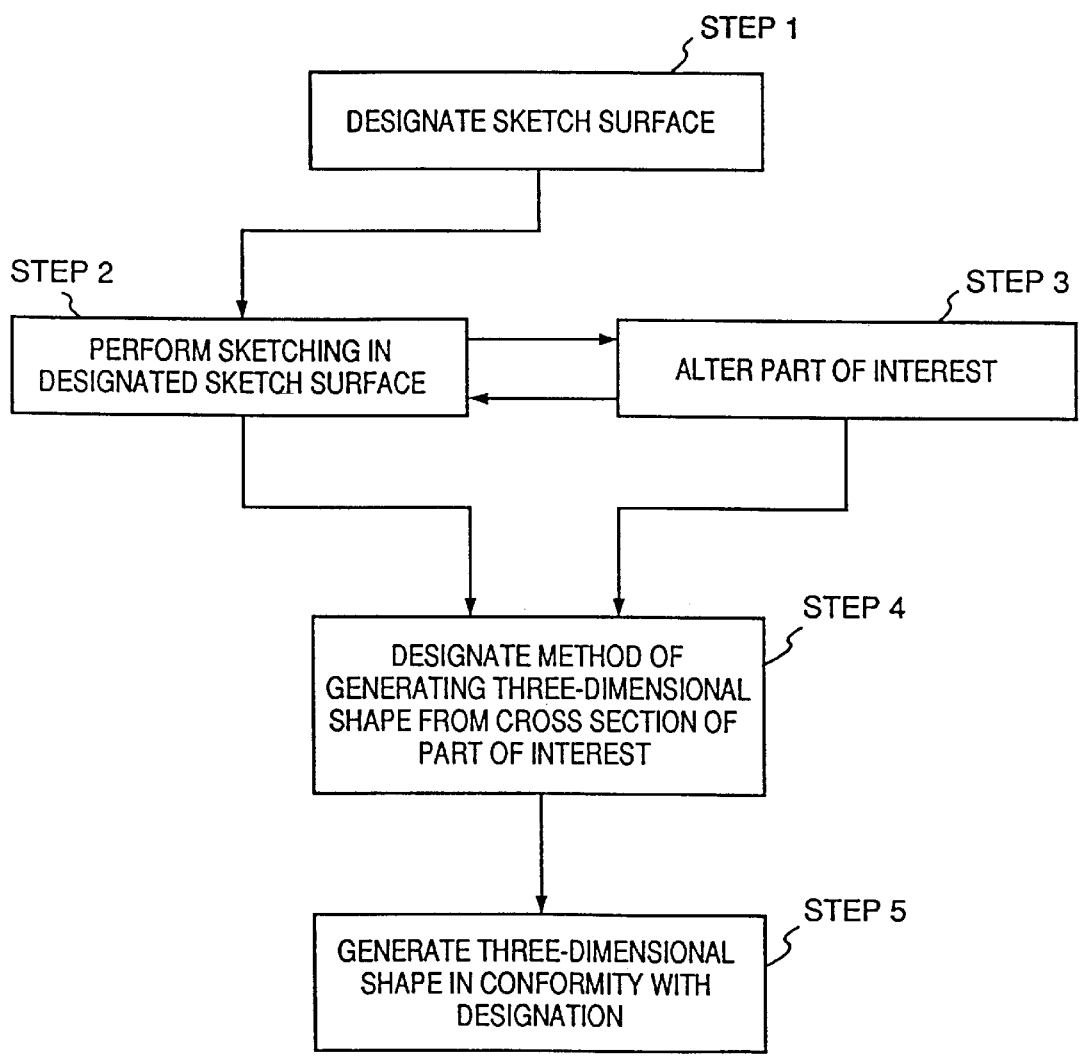
FIG. 3 is a flowchart illustrating the control procedure of this embodiment.

FIG. 3 is a flowchart showing the general principles of a shape modeling method according to this embodiment.

According to the characterizing feature of the technique shown in FIG. 3, once a "sketch surface" is designated at step 1, the operator is allowed at step 2 to make a sketch related to the sketch surface, designated at step 1, with regard to a certain part, and then is allowed at step 3 to change the part sketched while holding the designation of the sketch surface designated at step 1. When sketching related to the sketch surface designated at step 1 is concluded for a plurality of parts of interest, a three-dimensional shape is generated at steps 4 and 5 based upon the sketch. It should be noted that the term "sketch surface" is defined as a surface which allows the designer to create a "sketch" that serves as the basis for a shape change.

Figure 1A:
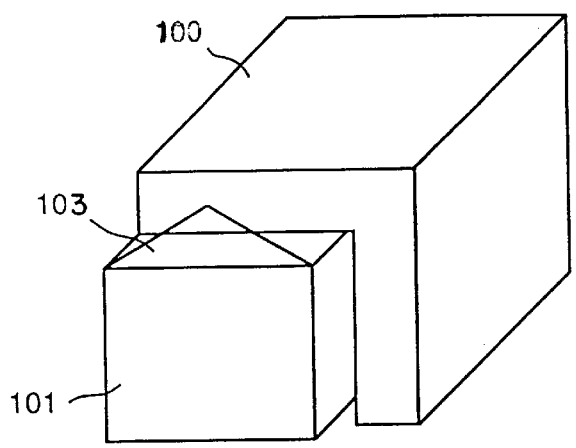
FIGS. 1A through 1E are diagrams for describing problems which arise in a CAD apparatus.
Figure 1B:
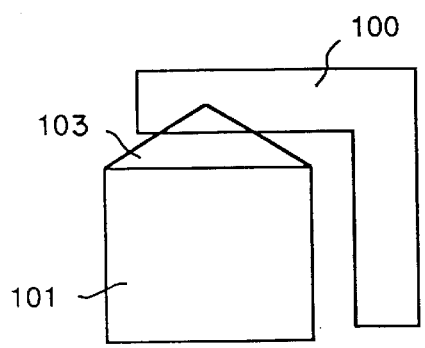
Figure 1C:
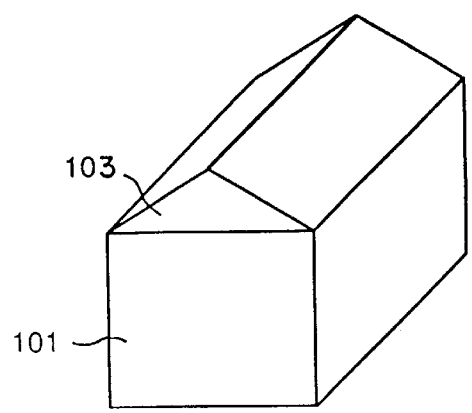
Figure 1D:
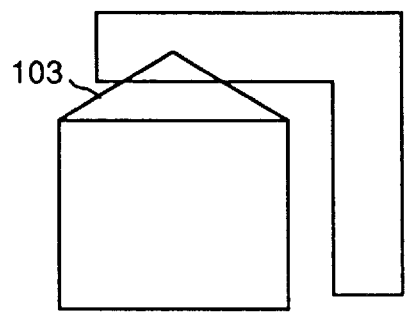
Figure 1E:
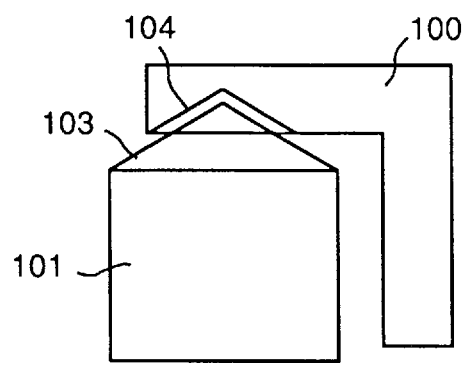

The foregoing will now be described in detail with reference to FIGS. 4A and 4B. According to the example of FIGS. 4A and 4B, the shape of a triangular prism is added between the L-shaped member 100 and the part 101 having the shape of the rectangular parallelepiped shown in FIG. 1A. At step 1, the front end face of the rectangular parallelepiped 101 is designated as the "sketch surface". That is, in this example, the "sketch surface" is defined to be the "end face" as viewed from the front of the parts 100, 101. It should be noted that the part to be sketched is designated before or at the same time as the designation of the "sketch surface". Next, at step 2, the operator is allowed to "sketch" the triangle 103 on the rectangle on the front of the rectangular parallelepiped 101, which is the part designated at step 1. This is followed by step 3, at which the operator changes the designation of the part to the L-shaped member 100. Even though the part designated is changed, there is no change in the designation of the "sketch surface" made at step 1.

When there is a change in the part designation, the process returns to step 2. Now the operator is allowed to "sketch" the cut-out shape 104 in the front view of the member 100. When this is done, a front view of the kind shown in FIG. 4A is obtained. Next, at steps 4 and 5, "pushing" processing is applied to the added shapes 103, 104. This processing provides a part 101' having an elongated projection (triangular prism) 103 and an L-shaped member 100' having the cut-out 104, as shown in the perspective view of FIG. 4B.

Thus, in accordance with this embodiment, the sketch surface is set as the cross section of a member. This improves the efficiency of design changes.

In design which takes the interference between members into consideration, it is better for the designer that this be performed based upon a view (sketch surface) from the same direction. With the design method in accordance with the control procedure of FIG. 3, parts can be altered one after another without changing the "sketch surface", and therefore design which takes interference into account can be performed efficiently at the "sketching" stage. In the prior art, a succeeding part cannot be altered until after the alteration of the preceding part has been completed. In certain cases, therefore, design of a part altered earlier is rendered meaningless by a change in the design of a part revised subsequently. By contrast, with the present embodiment, the creation of sketches regarding different parts can be performed without changing the "sketch surface". Consequently, even if the "sketch" of an earlier part should happen to be rendered meaningless by a design change of a later part, any labor wasted is minimal. This contributes to improved design efficiency.

<Detailed Description of Operation>

Figure 4A:
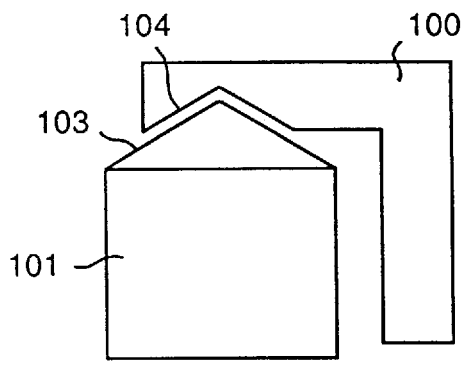
FIGS. 4A, 4B are diagrams for describing the principles of the invention.
Figure 4B:
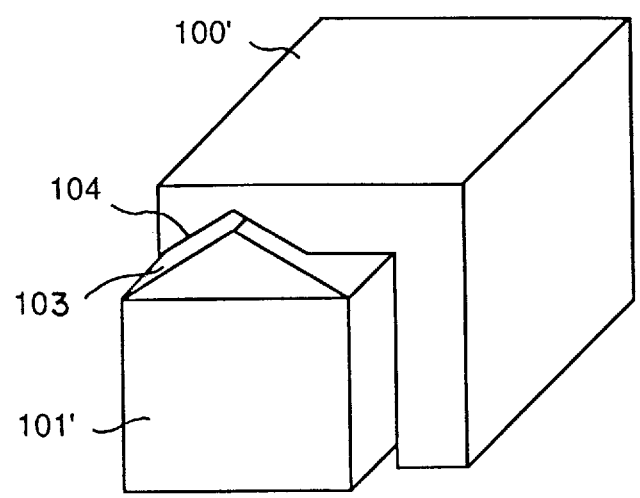

The CAD apparatus of the embodiment shown in FIG. 2 has not only the functions shown in FIGS. 3, 4A and 4B but also various other functions that make the apparatus easy to use.

The operation of the system shown in FIG. 2 will be described in greater detail while also describing these other functions.

FIG. 5A shows the composition of a parts table referred to an updated by the CAD program of this embodiment. The table stores various information regarding individual parts presently being painted by the CAD program. This information includes "shape data", "added data", "generation method" for generating an added shape, "order of attention" and "attention flag". The individual parts are identified by "identification numbers" (In FIG. 5A, the "identification numbers" are indicated by "1", "2", . . . ).

The "shape data" entry stores the address of the memory device 8 at which vector data constructing the shape of the particular part is stored. The "added data" entry indicates the storage location of vector data indicating a change in shape added to the corresponding part. In the example of FIG. 4A, numerals 103, 104 denote "added data". The "added data" is converted to a three-dimensional shape by the generation method ("pushing" processing in the example of FIG. 4B) designated by the "generation method". It should be noted that when the "added data" is converted to a three-dimensional shape, it is merged with the "shape data".

In a case where a unit comprising a plurality of parts is being designed, the "order of attention" entry indicates the order in which the constituent parts become the focus of attention. In the example of FIG. 5A, the order of entry 3, 1, 2, 5, 4 is assigned by the designer (or by the system) to a unit comprising five parts given the identification numbers "1" through "5". In accordance with this sequence, the parts are focused upon in the order "2"→"3"→"1"→"5"→"4". The "order of attention" is given by the designer or system. However, if a sequence in which a change in one part will influence (interfere with) another part is taken into consideration by the designer in advance, the "order of attention" can be given or altered in accordance with this sequence. In the example of FIG. 5A, it is assumed that a change in the design of part "2" will influence part "3" and compel a change in the design of part "3". The "part of interest", therefore, should be changed from "2" to "3". Further, since a change in the design of part "3" will compel a change in the design of part "1", the "part of interest", should be changed from "3" to "1". In this embodiment, the "part of interest" is changed automatically in accordance with the "order of attention" whenever a "PART" menu is selected, as will be described later. This is to lighten the load upon the operator.

The "attention flag" in the parts table indicates the part that is presently the focus of attention (namely the part that is presently the part of interest). In the example of FIG. 5A, part "3" is presently the focus of attention.

FIG. 5B is a stable storing various shape data designated by a "shape data" paper in the parts table of FIG. 5A. This table is set for every part. Vector data for forming the shape of a part and vector data for forming the shapes of front elevations and plan elevations are stored for each individual part. Though the shapes of front and plan elevations can be formed from vector data, a higher speed is achieved if these are generated in advance.

In this embodiment, the "sketch surface" signifies a "surface" (referred to as the "starting surface") at which the designer starts applying a design change to a part (or unit). The "starting surface" at which a design change is to be applied is easier for the designer to utilize if it is an end face of the part. Accordingly, it is convenient to stipulate a "sketch surface" by a so-called "view". A VIEW table shown in FIG. 5C indicates the types of views that can be used in the CAD system of the embodiment. In the example of FIG. 5C, nine types of views are defined. The main views are a front view (identifier "1"), plan view (identifier "2"), bottom view (identifier "3"), right view (identifier "4 "), left view (identifier "5") and back view (identifier "6"). The identifiers given for these views are made defaults by the system.

If parts are different even in the same view, then the "sketch surface" also differs. Accordingly, in this embodiment, when the view is designated in a state in which a part has been designated, the "sketch surface" for this part is decided.

In this embodiment, it is possible for the user to set and register views other than those mentioned above. Since these views are defined in the plane stipulating the sketch surface, this plan is stipulated by "distance" data and "angle" data from a coordinate origin, as shown in FIG. 5C.

The term "icon" in the table of FIG. 5C indicates an icon given for the particular view. These icons will be described later.

A control procedure illustrated in the flowchart of FIG. 3 and employing the tables shown in FIGS. 5A, 5B and 5C will now be described.

Step 1

At step 1, a surface to be sketched is designated in a cross section of a part. It is presumed that at the time step 1 is executed, parts from a 0th part onward are being displayed on the display unit 4. More specifically, shape data regarding these parts has been stored at locations indicated by the "shape data" pointers of the parts table. In order to designate the sketch surface, the following three methods are provided:

(1) A sketch surface is designated directly for each individual part using a pointing device such as a mouse. A cursor is moved to the position of the target surface by the mouse and the sketch surface is designated by clicking the mouse at this position. An "order of attention" is provided in the order in which the designations are made and this is written in the "order of attention" field of the parts table shown in FIG. 5A.

(2) The view is designated first, after which one part is designated. When this is done, that surface among the surfaces of the designated part which coincides with the designated view is adopted as the sketch surface. Further, among the surfaces of parts other than the designated part, surfaces having the same direction as that of the surface adopted as the "sketch surface" are adopted as "surfaces of interest" (i.e., sketch surfaces). The closer the sketch surface is to the front, the younger the "order of attention" given. Though the order of attention is given by the system, it can be altered by the operator.

(3) In a case where a plurality of views are being displayed, an already displayed view can be adopted as a sketch surface using the input unit 6, such as the mouse.

Display of parts means also that some parts are not displayed.

Figure 6A:
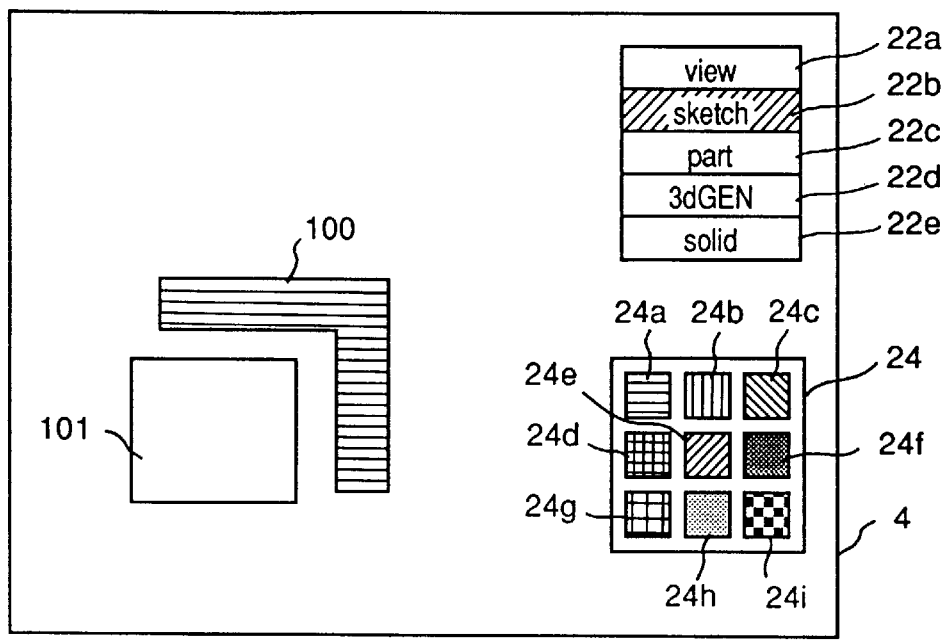
FIGS. 6A through 6D are diagrams for describing an example of the operation of this embodiment.

The method (2) above will now be described in detail. In this embodiment, a selected view can be displayed as a "tool". Such views are displayed at the lower right of the screen of the display unit 4 by designating a "VIEW" menu shown in FIG. 6A. In the example of FIG. 6A, nine views have been established and icons set for respective ones of these views are displayed. The operator is capable of identifying the type of view by the pattern on the icon. In this embodiment, the central processing unit 2 executes a CAD-program subroutine for registering sketch surfaces, thereby making it possible to register sketching views in the memory device 8 beforehand. A registered view can be displayed on a view panel 24 (FIG. 6A).

In a case where three-dimensional shapes of one or more parts or working surfaces for defining views are being displayed, a sketch surface is designated by designating a surface of the three-dimensional shape using the input unit 6 such as the mouse or keyboard. In such case, in order to decide the direction of a sketch surface, another surface or the like is utilized to make a designation above or below or to the left or right of the sketch surface, thereby making it possible to see the sketch surface from the front.

In this embodiment, sketching is carried out in a state in which a figure is displayed as it is seen from an angle designated by the view. The reason for this is that the shape of a sketch figure implemented while referring to the figure when seen from the front or side is accurate in terms of direction and size. In this embodiment, therefore, a sketch in a perspective view is not allowed since it would lack accuracy.

According to this embodiment, five types of views are provided, as shown in FIG. 6A. These views are "VIEW" 22a, "SKETCH" 22b, "PART" 22c, "3dGEN" 22d and "SOLID" 22e. The "VIEW" menu designates the direction from which the part is viewed in the display. "SKETCH" executes "sketching" in step 2 (FIG. 3). "PART" alters the diagram to which sketching is applied. "3dGEN" designates the generation of a three-dimensional shape. "SOLID" is a function which forcibly endows a displayed diagram with a sensation of depth since a diagram seen from the front or side lacks "solidness".

Figure 6B:
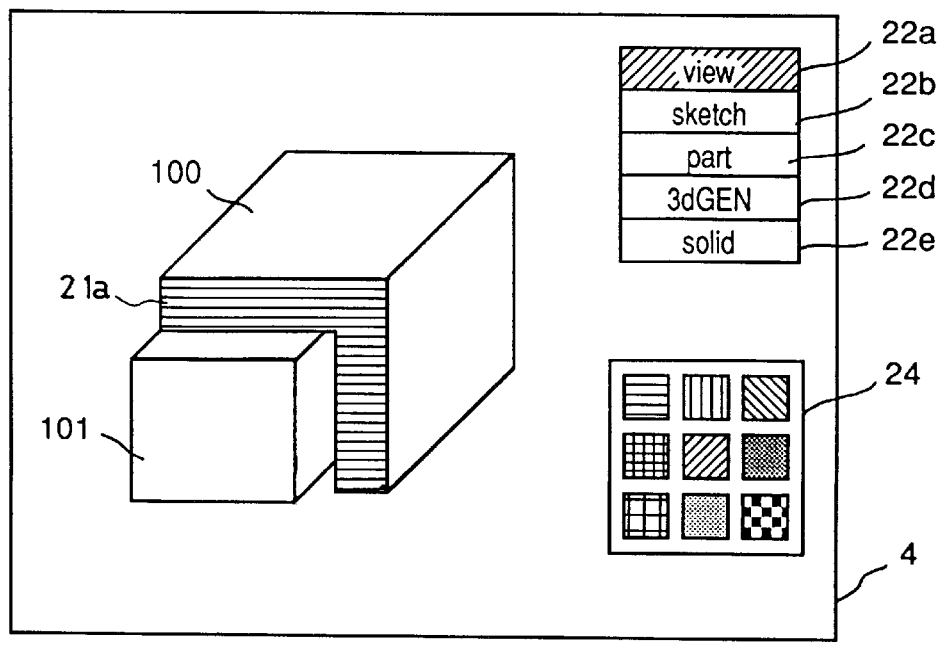
Figure 6C:
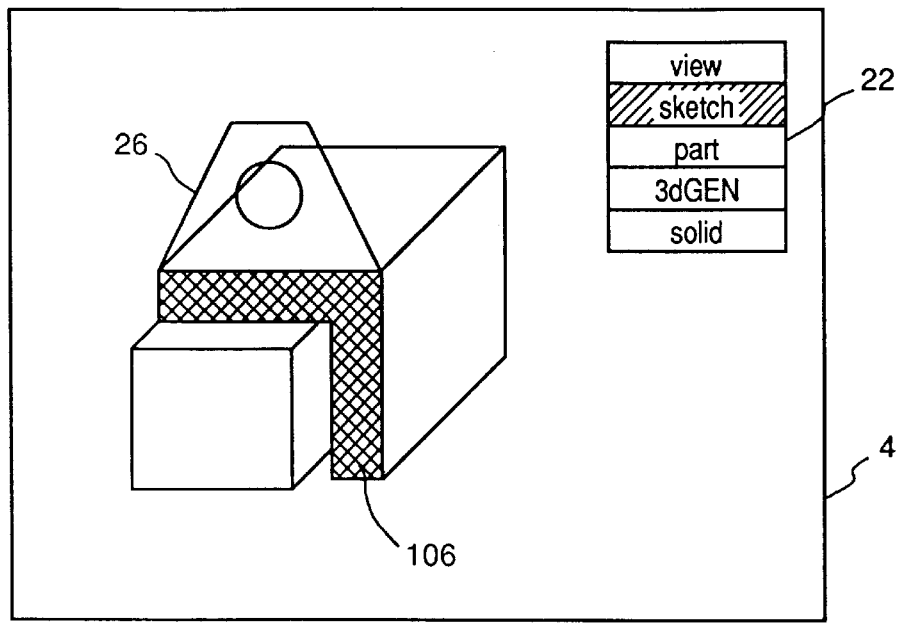

FIGS. 6A through 6C are diagrams for describing the processing of step 1 in detail. In FIG. 6A, the front views of two parts indicated by 100, 101 are displayed on the display unit 4. In order to designate the front view, the operator observes the view panel 24 and designates the icon indicating the desired view. If the VIEW menu 22a is selected, the view panel 24 is displayed. Views 24a, 24b, 24c, 24d, 24e and 24f for default top, side, bottom, right, left and back views, respectively, and already registered views 24g, 24h and 24i are displayed on the view panel 24. The "sketch surface" can be designated by using the input unit 6 such as the mouse to designate the desired view from the views in the view panel 24 [method (2) mentioned above] or to designate a particular surface being displayed in a three-dimensional shape of a part [method (1) mentioned above].

More specifically, the operator selects the VIEW menu 22a to display the view panel 24 and then selects the icon of any one of the views 24a through 24i. If the operator then uses the mouse to click a target part, the designated surface of the target part will be displayed on the display screen of the display unit 4. FIG. 6A illustrates the display obtained when part 100 is designated and icon 24a indicating the front view is selected.

In a case where part 100 has been designated in FIG. 6A and icon 24a is designated, surface 21a on the front of the part 100 is designated as the sketch surface and horizontal hatching is added to the surface 21a to indicate that this surface is a "surface of interest".

According to the example of FIG. 6A, solid shapes 100, 101 that have already been generated are displayed in the form of a front view by selecting the icon 24a. In order to perform part design, providing a solid display is desirable to give the appearance of solidness. Accordingly, when "SOLID" is selected in the menu, a figure giving the appearance of depth is forcibly added to the front view of FIG. 6A, as shown in FIG. 6B. The figure displayed in FIG. 6B is not a perspective view but is a provisional display for imitating a solid or cubic appearance.

A plan view or front view may be more useful than a perspective view in terms of determining what effect a change in the shape of part will have upon interference with another part. In the example of FIG. 6B, the front view is convenient for this purpose. In order to give the appearance of depth, a figure elongated in the depth direction is added on to the display of FIG. 6A, as illustrated in FIG. 6B.

Thus, the "sketch surface" is designated.

If the operator designates the menu "SKETCH" in the situation illustrated in FIGS. 6A and 6B, any shape can be drawn on the sketch surface. In FIG. 6C, the menu "SKETCH" is designated after the "sketch surface" is designated as in FIG. 6B, then a FIG. 26 having a circle placed in the trapezoidal figure is created on the part 100.

In a case where "SKETCH" in menu 22b is selected without designating the direction of the sketch surface after the desired view has been designated, it is possible to perform sketching while maintaining the state of the display shown in FIG. 6A. FIG. 6C illustrates a case in which sketching of the kind indicated at 26 has been performed on the designated sketch surface in the perspective view of FIG. 6B.

In a case where a previously registered view has been selected from the view panel 24, the sketch surface is displayed on the display unit 4 in the registered orientation.

The arrangement is such that a three-dimensional shape can be displayed together with the display of the sketch surface. The three-dimensional shape can be displayed in individual part units or in units of several parts, or the three-dimensional shape may not be displayed. In addition, a wire-frame display can be presented and a display is possible in which hidden lines are not displayed. Further, by not displaying unnecessary three-dimensional shapes or cross sections, the display speed of the display unit 4 can raised.

Further, a function for setting "display" or "non-display" with regard to sectional shapes is provided. If it is so arranged that a cross section is displayed or not displayed in individual part units or in units of several parts, operability is improved. This function can be implemented by processing executed by the central processing unit 2 upon designating "display" or "non-display" using the input unit 6. Information indicating which part or group of parts is displayed or not displayed is stored in the memory device 8 and displayed on the display unit 4 as necessary.

With a function for setting display or non-display, it is possible to perform a setting for displaying only one part of interest and the next part of interest.

Step 2

At step 2, the operator is allowed to create a cross section of a part of interest in a sketch surface designated at step 1. In this creation function, line segments, circular arcs, conics or spline curves can be created on the sketch surface. This is equivalent to what is seen in an ordinary two-dimensional CAD graphical function. The created cross section is displayed on the display unit 4 and the data is stored in the memory device 8. FIG. 6C shows a situation in which the FIG. 26 is "sketched" in a case where the display direction is designated as the front side.

The CAD apparatus of this embodiment is so adapted that three-dimensional shapes already displayed can be referred to by a sketch surface. By utilizing these shapes or already created sectional shapes, identical shapes or offset shapes, etc., can be created in the sketch surface. Further, a function is provided for deleting a sketched shape. This makes it possible to delete a sketched shape from the display unit 4 and memory device 8.

Step 3

When the menu "PART" is selected at step 2, the process proceeds to step 3. At this step, by using the designation of the view designated at step 1, the operator is allowed to alter the part whose cross section is sketched. When the menu "SKETCH" is selected at step 3, the process returns to step 2. When layout design of an assembly or unit comprising a plurality of parts is performed, as described in connection with FIGS. 4A and 4B, it is preferred that a design change be carried out from the same view with regard to each constituent part. Accordingly, a change as seen from the view, designated at step 1, of a part constructing the assembly or unit, is realized by "sketching" at step 2 while altering the part at step 3.

The operation of step 3 will be described in further detail while referring to the flowchart of FIG. 7. At step 2, the "sketch surface" of a part that is presently the part of interest since it is to be sketched is displayed so as to become conspicuous, as indicated at 106 in FIG. 6C. In the example of FIG. 6C, the part 100 is the part of interest. Accordingly, the "attention flag" corresponding to the part 100 is turned on. When "PART" in menu 22c is selected, the process proceeds to step 3. The details of step 3 are shown in FIG. 7.

Figure 7:
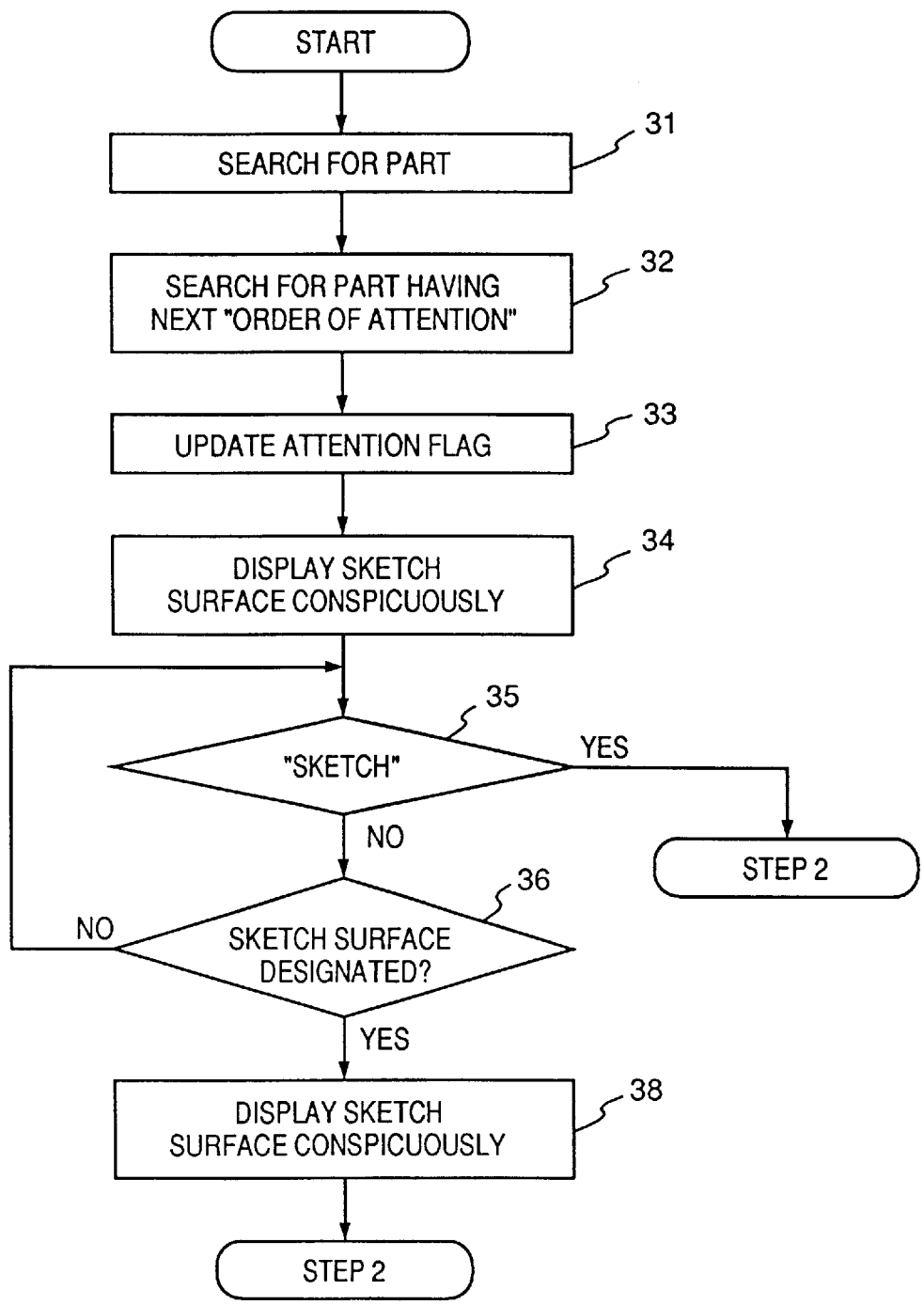
FIG. 7 is a flowchart illustrating part of a control procedure according to an embodiment.

At step 31 in FIG. 7, the processing unit 2 refers to the "order of attention" in the parts table. Next, at step 32, the processing unit 2 searches for a part having the "order of attention" value that follows the "order of attention" value of the part whose "attention" flag has been turned on. When this part is found, the "attention" flag of the preceding part is made "0" and the "attention" flag of the part found at step 32 is made "1", whereby the "attention" flag is updated at step 33. Next, at step 34, the "sketch surface" of the part found at step 32 is displayed in a conspicuous or emphasized manner. This "sketch surface" is the "sketch surface" of the pertinent part relating to the view designated at step 1 (FIG. 3).

If it is sensed at step S35 that the operator has selected "sketch", the process returns to step 2 to enable sketching. If it is sensed at step S36 that the operator has designated another "sketch surface" without abiding by the "order of attention", the "attention" flag is updated at step 37, just as at step 33, and this sketch surface that has been designated anew is displayed in emphasized fashion at step 38.

In the control procedure of step 7, it is presumed that the change in the "sketch surface" at step 36 is not accompanied by a change in the view designated at step 1. However, the above-described embodiment can be modified in such a manner that the change in the "sketch surface" is accompanied by a change in the view. In such case the view corresponding to the "sketch surface" designated at step S36 is retrieved and this view is stored in memory. <Modification of Part Alteration Processing>

Modification 1

In the above-described embodiment, the cross section (sketch surface) of a part of interest can be displayed on the display unit 4 by changing it to a color showing that it is the focus of attention, as shown in FIG. 6C. In this modification, the central processing unit 2 is internally provided with a function for setting the display color of a part. This makes it possible to set the display color of the part of interest or the like in advance using the input unit 6.

Modification 2

In a case where it is clarified in the search at step 32 that a part does not exist, the system creates default part names by allocating part names that are not being used. Furthermore, in a case where a new part name is created, the cross section can be sketched after the new part name is entered from the input unit 6 prior to step 2. In a case where the cross section of a part of interest is being sketched at step 2 and, in order to avoid interference with a neighboring part, the process makes a transition to step 3 at this time to advance the sketching of this neighboring part before that of the first-mentioned part, the process returns to step 2 and processing resumes from this step after the processing of step 3 ends.

Modification 3

In the example of FIG. 5A, the "order of attention" is allowed to be set to three of more parts. If the number of parts capable of being parts of interest is limited to two, control is simplified. This results in higher processing speed without much decline in operability. Accordingly, a concept based upon a "part of interest" and a "next part of interest" is established. The next part of interest becomes the part of interest at the moment of selection of the menu "PART", which is for altering the part of interest. At this time the part which was the part of interest up to now becomes the next part of interest. The part of interest and the next part of interest can be set one at a time. When it is desired to focus upon a part of interest as well as a part other than the next part of interest, the menu "PART" for changing the part of interest is selected and then the part desired to be made the part of interest is designated by the input unit 6. As for the method of designation, an identifier such as the part name is entered using the keyboard or mouse of the input unit 6, or a sectional shape or three-dimensional shape being displayed is designated directly by the mouse.

In a case where it is desired to design the arrangement mainly between two specific parts or the shapes of the parts, it is convenient if the next part of interest is set in advance.

Steps 4 and 5

At step 4, a method of generating a three-dimensional shape from the cross section of a part adopted as the part of interest at step 2 or 3 is designated. Method of generation include "pushing" a cross section or cutting a cross section, by way of example. A menu for the generation method is displayed on the screen of the display unit 4 by selecting "3dGEN" of menu 22d (FIG. 6A). More specifically, a command "PUSH"or "CUT", etc., is displayed on the display screen. The user selects the command appearing on the screen. The designated information is stored in the memory device 8.

This will be described taking the "PUSH" command as an example. In a case where a three-dimensional shape is generated by pushing a cross section, the operator selects the menu "PUSH" and designates the pushing direction, the amount of push and, if necessary, a surface or the like serving as a reference for pushing. As for the pushing direction, selection is made from "forward", "rearward" and "both sides" using the input unit 6. The value of the amount of push is entered using the input unit 6, such as the keyboard.

Figure 6D:
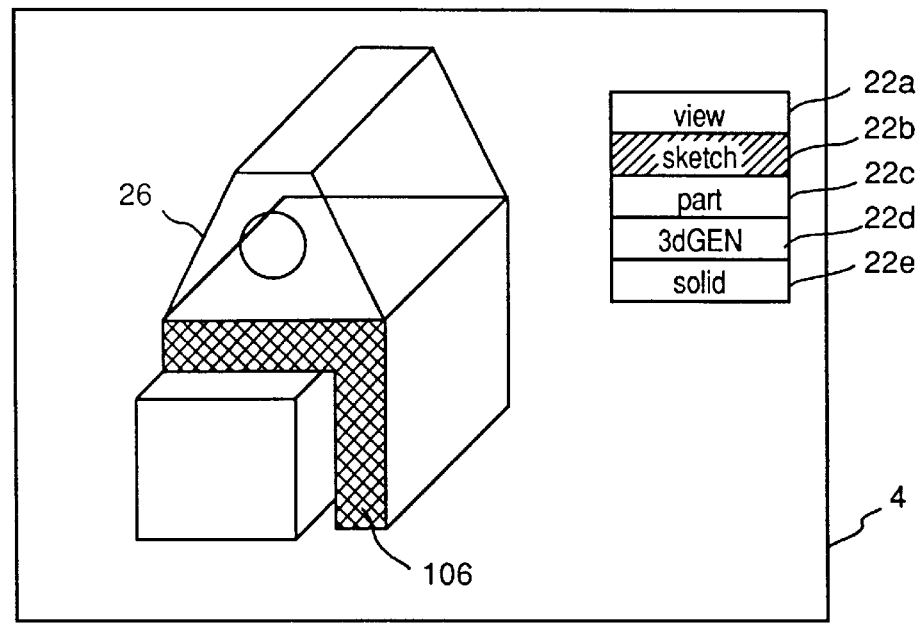

At step 5, a three-dimensional shape is generated based upon the designation entered at step 4. In the example of FIG. 6C, a shape of the kind shown in FIG. 6D is generated and displayed by "pushing" processing.

According to the embodiment described above, in a case where a design change is made with regard to one or a plurality of parts when the arrangement of a plurality of parts in a mutually interfering positional relationship is designed, once a single view or direction is designated, an operation for altering a part can be performed even if the operation for altering another part is incomplete. More specifically, even if a design change relating to parts 101 and 100 is incomplete (i.e., even though the views are plan views 103, 104 and not cubic), as shown in FIGS. 4A and 4B, parts can be altered. Operability is improved as a result.

<Modification of Sketch Processing Operation>

In the embodiment described above, there is one designation of view. In layout design or the like, it is preferred in terms of operability that it be possible to perform a design change while checking for interference between parts not merely in one direction but in a plurality of directions simultaneously. Accordingly, in the modification described below, it is so arranged that in the course of "sketching" with regard to one view, a part may be displayed based upon another view.

Figure 8A:
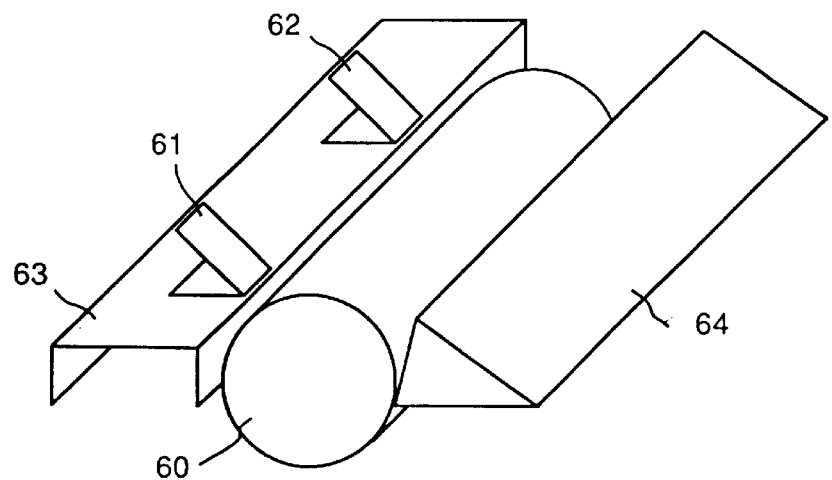
Figure 8B:
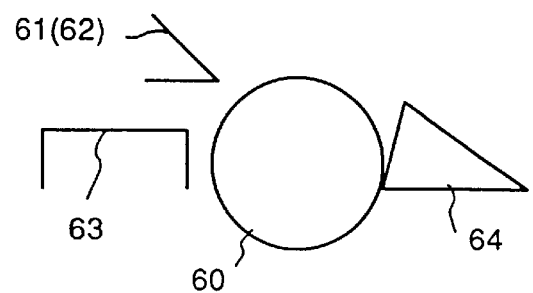

Assume that five three-dimensional shapes 60~64 have been generated, as shown in FIG. 8A. If the view is designated to be from the front side in order to clean up the displayed figures, a display of the kind shown in FIG. 8 is obtained.

Figure 8C:
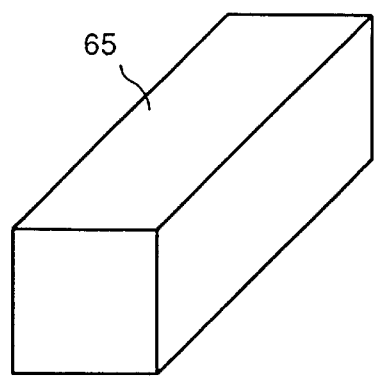

Here a case is assumed in which an attempt is made to create a rectangular parallelepiped 65, of the kind shown in FIG. 8C, above a cylinder 60. The rectangular parallelepiped 65 has a length in the depth direction that is the same as the length of the cylinder 60 in the depth direction. In order to use the "push" command and stipulate a rectangular parallelepiped having a length in the depth direction that is the same as that of the cylinder 60, it is necessary that the back side of the cylinder 60 be designated on the display screen. Accordingly, in this embodiment, another view (a plan view in which it is possible to designate the back side of the cylinder 60, for example) is allowed to be designated during the execution of step 4.

Figure 8D:
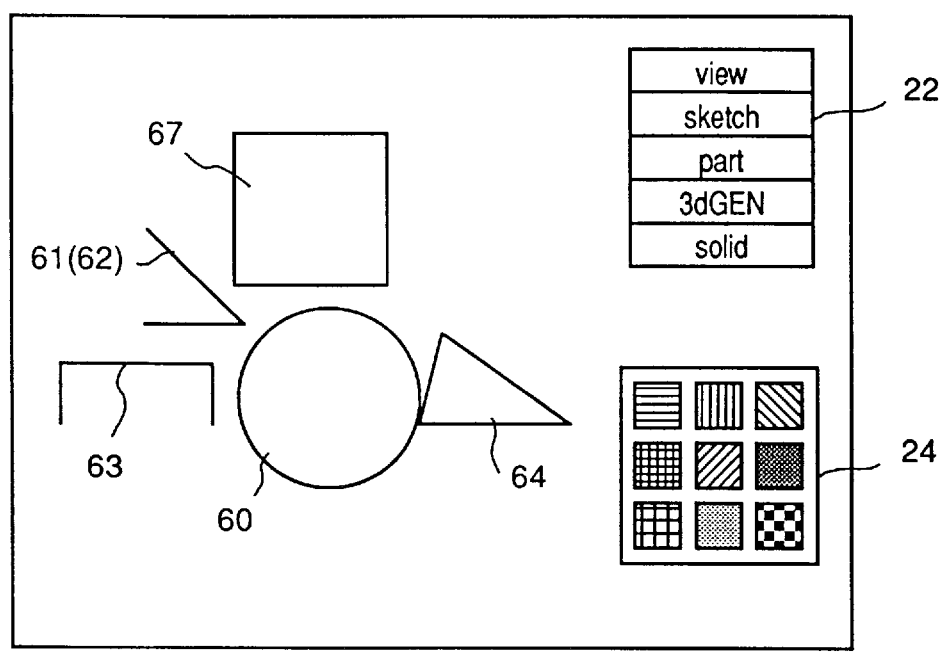

First, at step 1, the front surface of the cylinder 60 is designated as the "sketch surface". Next, at step 2, a quadrangle 67 constituting the front surface of the rectangular parallelepiped 65 is created above the cylinder 60, as illustrated in FIG. 8D. Next, the menu "3dGEN" is selected, whereupon the designer attempts to designate a shape creation method for the rectangular parallelepiped 65. When the menu "VIEW" is selected at this time, the VIEW panel 24 appears on the display screen, as shown in FIG. 8D. The operator selects "PLAN" view in order to make it possible to designate the back side of the cylinder 65. When this is done, a new window 32 based upon the designated view is displayed, as illustrated in FIG. 9. The window 32 displays plan views of the cylinder 60, wedges 61, 62, a U-shaped FIG. 63 and a triangular prism 64. If the plan view of the cylinder 60 is displayed, it becomes possible to designate the back side 48 of the cylinder 60. In order to designate the length of the rectangular parallelepiped in the depth direction thereof, the designer designates the back surface 48 using the mouse or the like. When a "depth" command is selected, the rectangular parallelepiped is extended from the quadrangle 67 to the surface 48, as shown in FIG. 9.

The foregoing is an overview of processing relating to modification of sketch processing. Whether or not processing relating to this modification is executed is decided based upon whether the menu "VIEW" has been selected at step 4 in FIG. 3. When it is sensed at step 4 in FIG. 3 that the menu "VIEW" has been selected, the control procedure of FIG. 10 is called.

Figure 10:
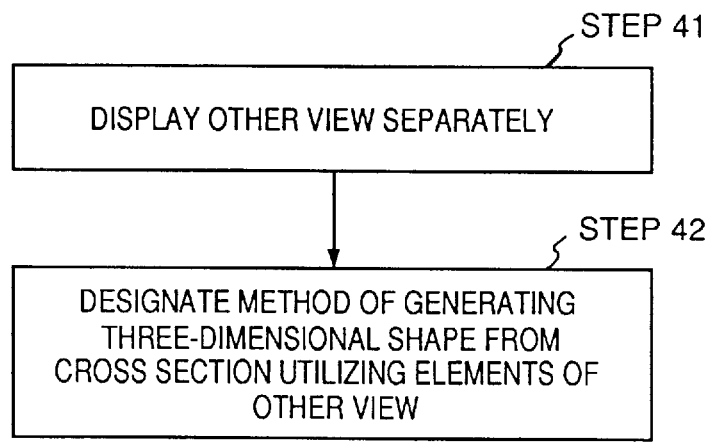
FIG. 10 is a flowchart illustrating the control procedure of the modification.

As shown in FIG. 10, the VIEW panel is displayed separately at step 41. Through a method similar to that of step 1 (FIG. 1), the operator designates "SKETCH SURFACE" from the pertinent part displayed in accordance with the separately designated view. In the example of FIG. 9, the surface 48 is designated as the new sketch surface. When "3dGEN" in menu 22 is selected, a command menu such as "PUSH" or "CUT" is displayed concurrently.

Next, at step 42, the elements of a sectional shape or three-dimensional shape in the other window 32 are utilized to designate a method of generating a three-dimensional shape from the designated "sketch surface".

The description returns again to step 4 (FIG. 1). In a case where a three-dimensional shape is generated upon performing cutting at a cross section, the menu "CUT" for generating a three-dimensional shape by such cutting is selected and menus "CUTTING DIRECTION" an "CUTTING AMOUNT" displayed attendant upon this selection can be designated. If necessary, a surface or the like serving as a reference for cutting can be designated. As for the cutting direction, selection is made from "forward", "rearward" and "both sides" using the input unit 6. The value of the amount of cutting is entered using the input unit 6, such as the keyboard. Designation through a portion of a part or surfaces on both sides cut utilizing another view described above can be designated using the input unit 6, such as the mouse. In the case of cutting, it is necessary that the part of interest already have a three-dimensional shape produced as by pushing.

<Other Modification>

In this modification, a function for correcting error in the shape of a figure is provided so that, when necessary, a correction can be made so as to construct a cross sectional shape of connected figure elements.

Further, a shape can be corrected by providing means for assigning dimensions between the shapes of figures or for applying a shape restriction, such as a parallel, horizontal or vertical restriction or a certain element placed upon other elements.

At step 5, the central processing unit 2 refers to the method of generating a three-dimensional shape in the memory device 8, calculates the three-dimensional shape by add-on or deletion, displays the result on the display unit 4 and alters the data representing the three-dimensional shape of the part of interest that has been stored in the memory device 8.

At any stage at which the processing of step 2 or step 3 is being executed, the processing of step 1 is executed and the processing of step 2 or step 3 can be carried out with a different cross section serving as a new sketch surface. In this case, the information sketched thus far is saved in the memory device 8. When this sketch surface is designated again at step 1 or step 4, the information sketched in this sketch surface thus far is displayed on the display unit 4.

In this embodiment, a plurality of parts undergo arrangement and shape definition while a part of interest is altered view by view, a view sketched (made the focus of attention) is altered as required and the plurality of parts are subjected to arrangement and shape definition while the part of interest is altered in this view.

Further, with regard to a shape already created, hysteresis such as method of creation is stored in the memory device 8. In this embodiment, a method of generating a sectional shape or a three-dimensional shape from a sectional shape can be changed by providing means for correcting shape. In this case also, the arrangement and shape definition is performed while altering the part of interest, the view sketched (made the focus of attention) is altered as required and the plurality of parts are subjected to arrangement and shape definition while the part of interest is altered in this view.

[Effects of the Invention]

Thus, according to the shape molding apparatus and method of the invention as described above, a surface in which the cross section of a part of interest is sketched is designated and the part of interest is capable of being altered in the designated surface. This makes it possible to readily design the arrangement and shape of a plurality of parts.

As many apparently widely different embodiments of the present invention can be made without departing from the spirit and scope thereof, it is to be understood that the invention is not limited to the specific embodiments thereof except as defined in the appended claims.

What is claimed is:

1. A modeling apparatus for generating and displaying three-dimensional figures representing a shape of a plurality of parts on a display screen, comprising:

first designating means for designating a particular view associated with a surface of the plurality of parts to be sketched on, said surface representing a shape of the plurality of parts;

sketching means for sketching, on the display screen, a desired two-dimensional figure on surfaces of the plurality of parts in the designated particular view; switching means for switching a target part over the plurality of parts and designating a surface of the switched-over part in the designated particular view;

control means for permitting the sketching means to sketch a desired two-dimensional figure in the designated particular view on the surface of the switched-over part designated by the switching means; and generating means for generating and displaying three-dimensional figures in the designated particular view of the plurality of parts based upon the two-dimensional figures sketched.

2. The apparatus according to claim 1, wherein said first designating means designates a direction of one surface representing a shape of said designated part as a particular view.

3. The apparatus according to claim 1, further comprising second designating means for designating a generating method of generating a three-dimensional shape, wherein said generating means generates the three-dimensional shape, based upon the two-dimensional figure, by the generating method designated by said second designating means.

4. The apparatus according to claim 1, wherein said first designating means has:

means for designating direction of a view on the display screen; and third designating means for designating the surface of the one part as the sketch surface in the designated direction of the view.

5. The apparatus according to claim 4, further comprising:

memory means for storing the direction of the view designated by said third designating means;

means for altering and designating a target part; and means for controlling the sketching means to sketch on a surface of the part altered and designated in the direction of the view stored by said memory means.

6. The apparatus according to claim 5, further comprising:

fourth designating means for designating alteration of a target part; and means for selecting a specific part, from among a plurality of target parts, in accordance with a prescribed sequence whenever said fourth designating means designates alteration of a target part.

7. The apparatus according to claim 6, wherein said sequence is capable of being changed.

8. The apparatus according to claim 4, wherein the direction of the view one among a front-side direction, top-side direction, right-side direction, left-side direction, bottom-side direction and back-side direction.

9. The apparatus according to claim 8, wherein a pseudo-three-dimensional image is displayed in addition to the designation direction of the view.

10. The apparatus according to claim 1, wherein said first designating means has:

means for designating directions of different first and second views on the display screen;

means for designating the surface of the one part in the direction of the first view; and said generating means generating the three-dimensional shape from the sketched two-dimensional shape utilizing a cross section of this part in the direction of the second view.

11. A method of generating and displaying three-dimensional figures representing a shape of a plurality of parts on a screen, comprising the steps of:

(a) designating a particular view associated with a surface of the plurality of parts to be sketched on, said surface representing a shape of the plurality of parts;

(b) sketching on the display screen, a desired two-dimensional figure on surfaces of the plurality of parts in the designated particular view;

(c) switching a target part over the plurality of parts and designating a surface of the switched-over part;

(d) sketching a desired two-dimensional figure in the designated particular view on the surface of the switched-over part designated in the switching step; and (e) generating and displaying three-dimensional figures in the designated particular view of the plurality of parts based upon the two-dimensional figures sketched.

12. The method according to claim 11, wherein said step (a) designates a direction of one surface representing a shape of said designated part as a particular view.

13. The method according to claim 11, further comprising:

designating a generating method of generating a three-dimensional shape; and generating the three-dimensional shape, based upon the two-dimensional figure, by the designated generating method.

14. The method according to claim 11, further comprising the steps of:

designating direction of a view on the display screen; and designating the surface of the one part as the sketch surface in the designated direction of the view.

15. The method according to claim 14, further comprising the steps of:

storing the designated direction of the view;

altering a target part; and sketching on a surface of the altered target part in the direction of the view stored.

16. The method according to claim 15, further comprising the steps of:

designating alteration of a target part; and selecting a specific part, from among a plurality of target parts, in accordance with a prescribed sequence when ever alteration of a target part is designated.

17. The method according to claim 16, wherein said sequence is capable of being changed.

18. The method according to claim 14, wherein the direction of the view one among a front-side direction, top-side direction, right-side direction, left-side direction, bottom-side direction and back-side direction.

19. The method according to claim 18, wherein a pseudo-three-dimensional image is displayed in addition to the designation direction of the view.

20. The method according to claim 11, further comprising the steps of:

designating direction of different first and second views on the display screen;

designating the surface of the one part in the direction of the first view; and generating the three-dimensional shape from the sketched two-dimensional shape utilizing a cross section of this part in the direction of the second view.

* * * * *